(12) United States Patent
Kroppe (10) Patent No.: US 7,740,305 B2
(45) Date of Patent: Jun. 22, 2010

(54) CORNER CAP ASSEMBLY FOR VAN-STYLE TRUCK BODY

(75) Inventor: William Kroppe, Wyomissing, PA (US)

(73) Assignee: Morgan Trailer Financial Management, LLP., Houston, TX (US)

( * ) Notice: Subject to any disclaimer, the term of this patent is extended or adjusted under 35 U.S.C. 154(b) by 0 days.

(21) Appl. No.: 12/265,057

(22) Filed: Nov. 5, 2008

(65) Prior Publication Data

US 2009/0236873 A1    Sep. 24, 2009

Related U.S. Application Data

(60) Provisional application No. 61/037,830, filed on Mar. 19, 2008.

(51) Int. Cl.
*B62D 33/04* (2006.01)
(52) U.S. Cl. .................................................. 296/182.1
(58) Field of Classification Search ............. 296/182.1, 296/185.1, 186.1, 191, 29
See application file for complete search history.

(56) References Cited

U.S. PATENT DOCUMENTS

| | | | |
|---|---|---|---|
| 1,894,356 A | | 1/1933 | Lewis |
| 2,471,917 A | * | 5/1949 | Wilson .................... 296/186.1 |
| 2,489,670 A | | 11/1949 | Powell |
| 2,502,703 A | | 4/1950 | Chaplin |
| 2,561,098 A | * | 7/1951 | Cole ........................ 296/182.1 |
| 2,585,976 A | | 2/1952 | Teeter |
| 2,594,131 A | | 4/1952 | Daines |
| 2,600,140 A | | 6/1952 | Torseth |
| 2,812,973 A | * | 11/1957 | Pritchard ................. 296/186.1 |
| 2,934,371 A | * | 4/1960 | Warren ........................ 52/581 |
| 2,993,728 A | * | 7/1961 | Beran et al. .............. 296/182.1 |
| 3,363,231 A | | 1/1968 | Grosgebauer et al. |
| 3,796,457 A | * | 3/1974 | Hinchliff ................. 296/182.1 |
| 3,834,575 A | | 9/1974 | Carr |
| 4,125,972 A | | 11/1978 | Pate |
| 4,403,804 A | * | 9/1983 | Mountz et al. ........... 296/181.5 |
| D305,320 S | * | 1/1990 | Mountz ..................... D12/181 |
| 5,004,293 A | | 4/1991 | Thomas |
| 5,112,082 A | | 5/1992 | Clelland |

(Continued)

FOREIGN PATENT DOCUMENTS

EP    1 288 112 A1    3/2003

(Continued)

*Primary Examiner*—Patricia L Engle
*Assistant Examiner*—Gregory Blankenship
(74) *Attorney, Agent, or Firm*—Berenato & White, LLC (57) ABSTRACT

An enclosed freight body of a van-style cargo vehicle for transporting cargo comprises a side wall assembly, an end wall assembly and a roof assembly, and a multi-piece corner cap assembly interconnecting converging portions of the side wall assembly, the end wall assembly and the roof assembly together. The multi-piece corner cap assembly includes a rigid reinforcing member structurally interconnecting the side wall assembly and the end wall assembly, and a protective cover member attached to each of the side wall assembly, the end wall assembly and the roof assembly so as to cover the rigid reinforcing member from outside of the freight body. Also, the protective cover member is made of a flexible impact resistant material, while the rigid reinforcing member is made of a high stiffness and high strength material. The multi-piece corner cap system provides a combination of stiffness, strength, impact resistance and cost effectiveness.

18 Claims, 11 Drawing Sheets

U.S. PATENT DOCUMENTS

| | | | |
|---|---|---|---|
| 5,131,714 A * | 7/1992 | Evans et al. | 296/182.1 |
| 5,143,416 A | 9/1992 | Karapetian | |
| 5,385,391 A | 1/1995 | Dickerson | |
| 6,290,285 B1 | 9/2001 | McCormack | |
| 7,338,111 B2 * | 3/2008 | Lemmons | 296/186.1 |
| 7,494,177 B2 * | 2/2009 | Henning | 296/186.1 |
| 2009/0236873 A1 * | 9/2009 | Kroppe | 296/186.1 |

FOREIGN PATENT DOCUMENTS

| | | |
|---|---|---|
| GB | 732191 | 6/1955 |

* cited by examiner

CORNER CAP ASSEMBLY FOR VAN-STYLE TRUCK BODY

CROSS-REFERENCE TO RELATED APPLICATION

This Application claims the benefit under 35 U.S.C. 119(e) of U.S. Provisional Application No. 61/037,830 filed Mar. 19, 2008 by William J. Kroppe.

BACKGROUND OF THE INVENTION

1. Field of the Invention

The present inventions relates to van-style cargo truck bodies in general and more particularly to a corner cap assembly of an enclosed van-type cargo truck body.

2. Description of the Prior Art

Figure 1:
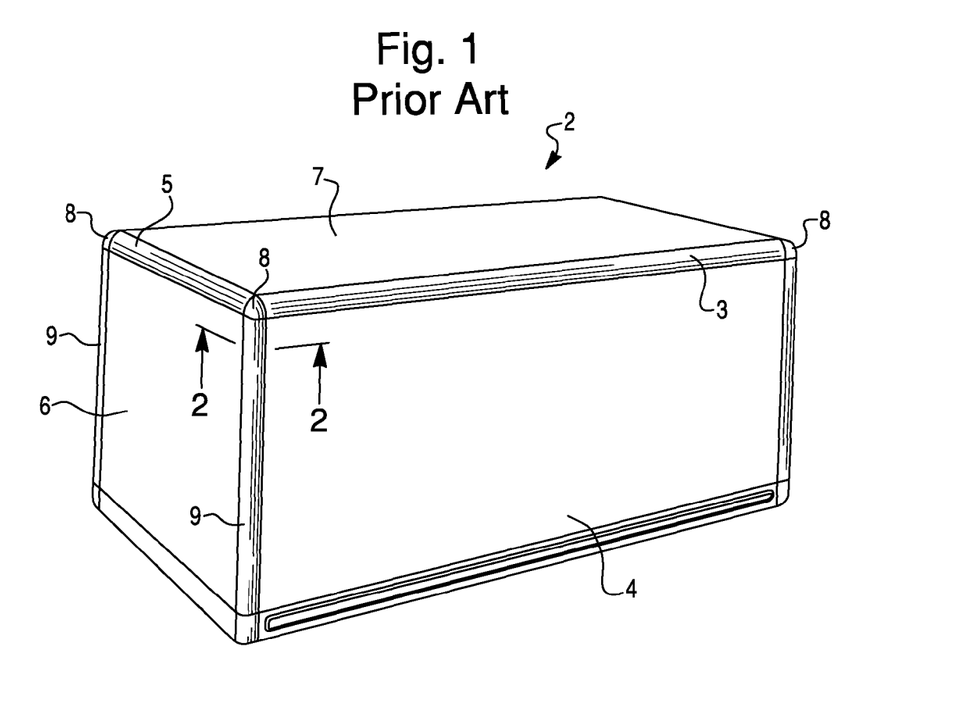
FIG. 1 is a perspective view of a conventional van-style cargo truck body.
Figure 2:
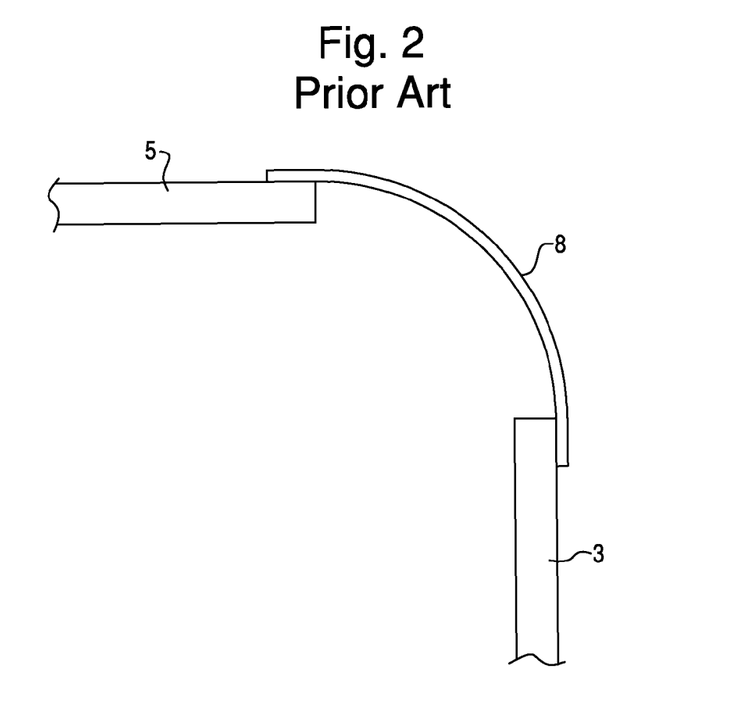
FIG. 2 is a sectional view of a corner cap member of the prior art.

A large number and variety of enclosed, van-style cargo truck bodies are currently available and in widespread use. Typically, as illustrated in FIGS. 1 and 2, the conventional van-style cargo truck body 2 has opposite left and right side panels 4 (only left side panel is visible in FIG. 1), opposite front and rear panels 6 (only font panel is visible in FIG. 1), and a roof panel 7. As further illustrated in FIG. 1, the conventional van-style cargo truck body 2 also includes an first elongated corner radius member 3 interconnecting the side panel 4 and the roof panel 7, a second elongated corner radius member 5 interconnecting the end panel 6 and the roof panel 7, and a third elongated corner radius member 9 interconnecting the side panel 4 and the end panel 6. Typically, each corner of the roof panel 7 is connected to one of the side panels 4 and one of the front and rear panels 6 through a corner cap member 8. More specifically, each of the corner cap members 8 is fastened to the first, second and third corner radius members 3, 5 and 9, as illustrated in FIG. 2. Currently, the corner cap member 8 is in the form of a single-piece part made of aluminum or plastic without any reinforcement. The aluminum corner cap member provides reasonable strength and fatigue resistance at the expense of high cost and low impact resistance. The plastic corner cap member provides low cost and high impact resistance at the expense of low strength and fatigue resistance.

Therefore, the need therefore exists for a corner cap assembly for van-style cargo truck bodies that offers a combination of stiffness, strength, impact resistance and cost effectiveness, and is economical to package and manufacture.

SUMMARY OF THE INVENTION

The present invention provides a novel enclosed freight body of a van-style cargo vehicle for transporting cargo.

The enclosed freight body of the present invention comprises a side wall assembly, an end wall assembly and a roof assembly, and a multi-piece corner cap assembly interconnecting converging portions of the side wall assembly, the end wall assembly and the roof assembly together. The multi-piece corner cap assembly includes a rigid reinforcing member structurally interconnecting the side wall assembly and the end wall assembly, and a protective cover member attached to each of the side wall assembly, the end wall assembly and the roof assembly so as to cover the rigid reinforcing member from outside of the freight body. Also, the protective cover member is made of a flexible impact resistant material, while the rigid reinforcing member is made of a high stiffness and high strength material.

Therefore, the present invention provides the enclosed freight body with a novel a multi-piece corner cap assembly for an enclosed van-style cargo truck body of a motor vehicle that provides a combination of stiffness, strength, impact resistance and cost effectiveness.

BRIEF DESCRIPTION OF THE DRAWINGS

Other objects and advantages of the invention will become apparent from a study of the following specification when viewed in light of the accompanying drawings, wherein.

DESCRIPTION OF PREFERRED EMBODIMENTS

The preferred embodiment of the present invention will now be described with the reference to accompanying drawing.

For purposes of the following description, certain terminology is used in the following description for convenience only and is not limiting. The words such as "front" and "rear", "left" and "right", "top" and "bottom", "inwardly" and "outwardly" designate directions in the drawings to which reference is made. The words "smaller" and "larger" refer to relative size of elements of the apparatus of the present invention and designated portions thereof. The terminology includes the words specifically mentioned above, derivatives thereof and words of similar import. Additionally, the word "a", as used in the claims, means "at least one".

Figure 3A:
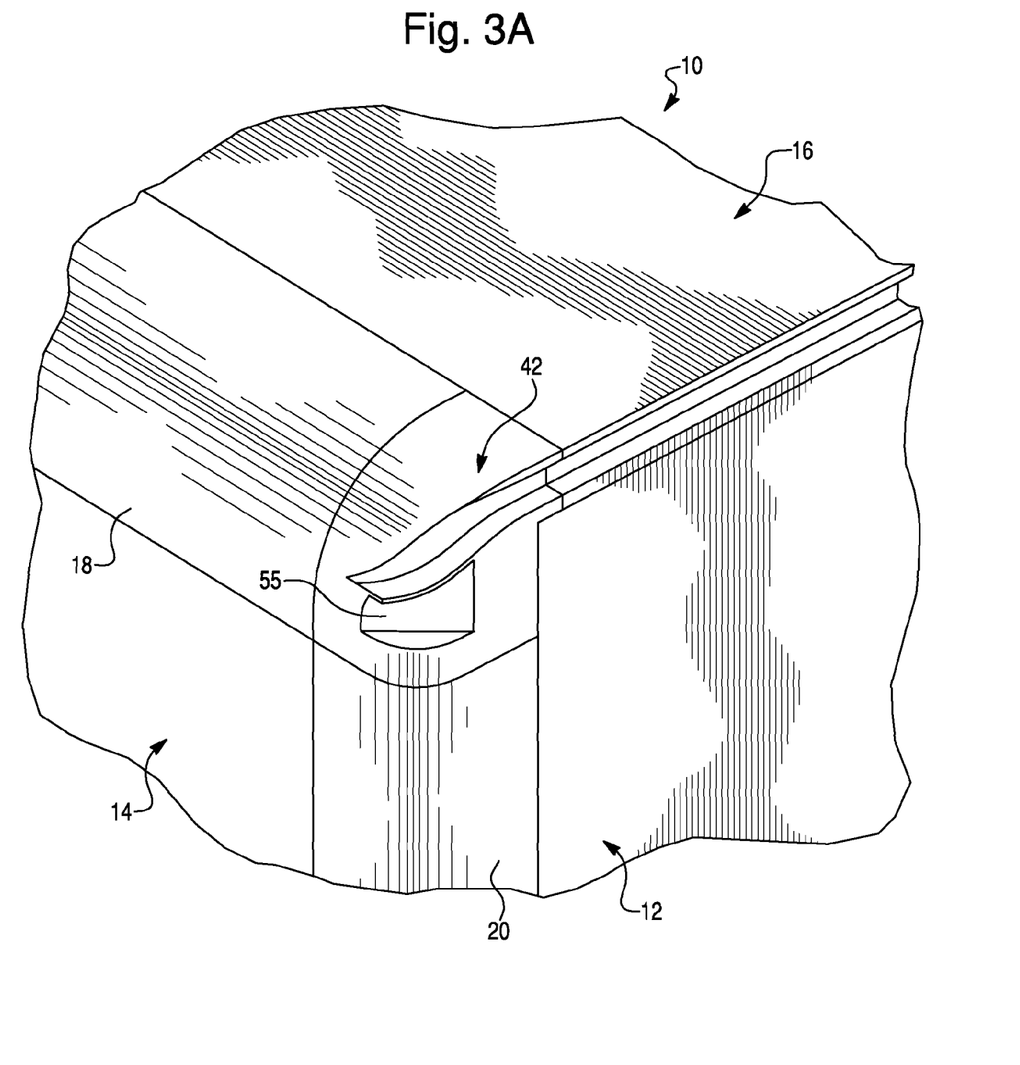
FIG. 3A is a partial exterior perspective view of a van-style cargo truck body according to a preferred embodiment of the present invention.
Figure 5:
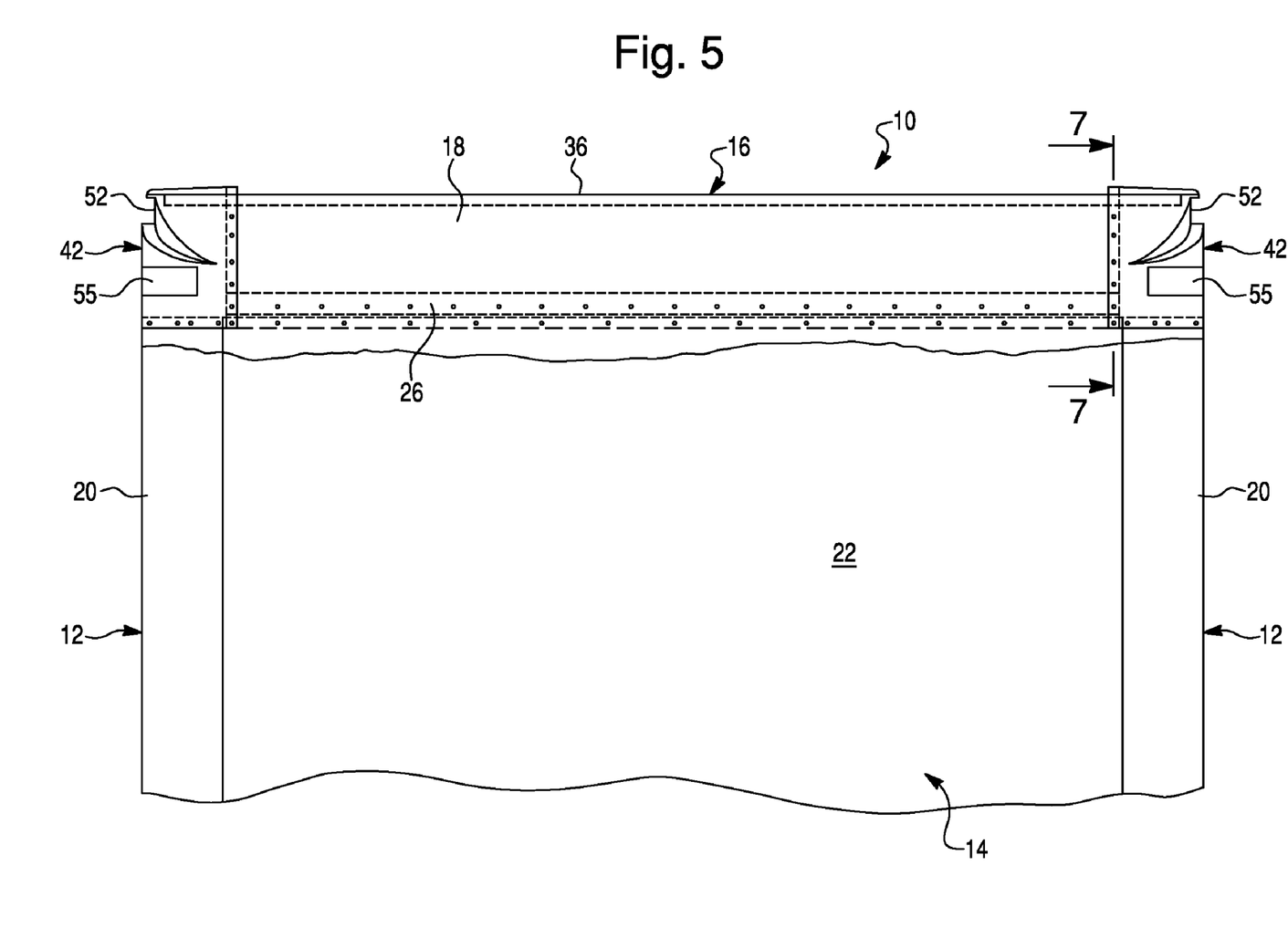
FIG. 5 is a partial front view of the van-style cargo truck body according to the preferred embodiment of the present invention.
Figure 6:
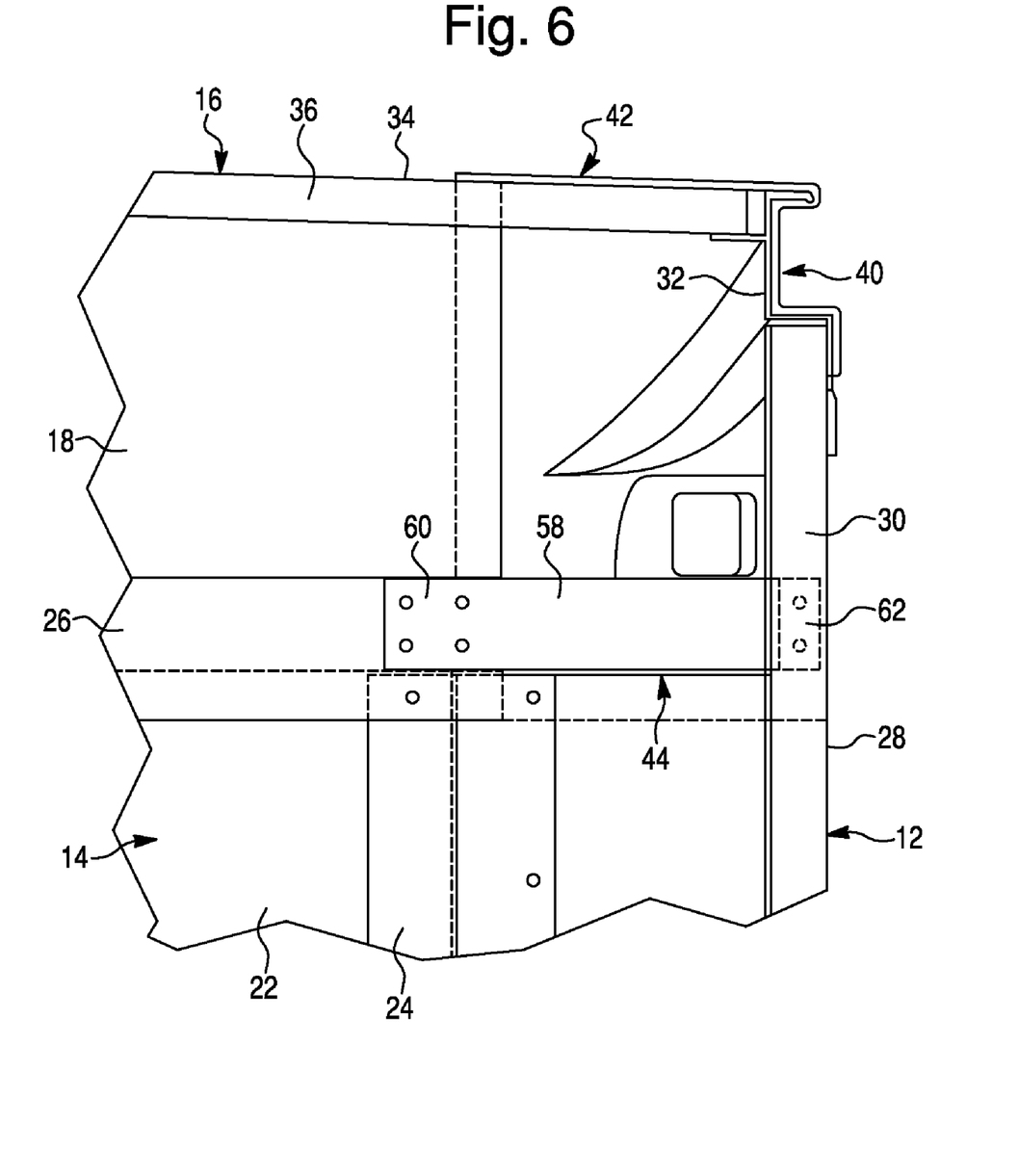
FIG. 6 a partial sectional view of the van-style cargo truck body according to the preferred embodiment of the present invention taken along the line 6-6 of FIG. 4.
Figure 7:
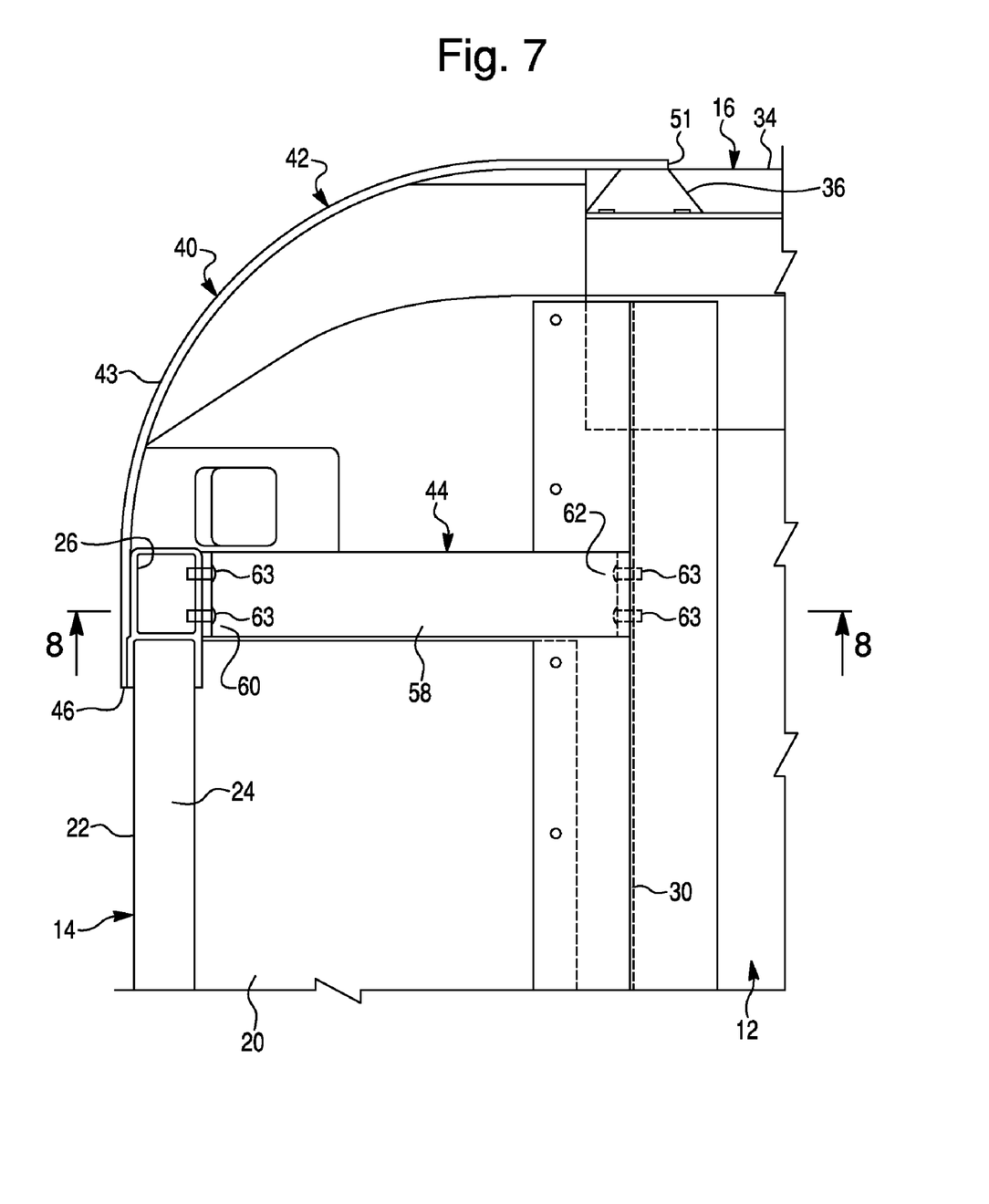
FIG. 7 a partial sectional view of the van-style cargo truck body according to the preferred embodiment of the present invention taken along the line 7-7 of FIG. 5.

Referring now to FIGS. 3A-8 of the drawings, a fully enclosed freight body of a van-style cargo truck according to the preferred embodiment of the present invention is depicted. The van-style cargo truck body, generally denoted by reference numeral 10, comprises opposite left and right side wall assemblies $12_L$ and $12_R$ (only font panel is visible in FIG. 1), opposite front and rear end wall assemblies 14 (only the font end wall assembly 14 is visible in FIG. 3), and a roof assembly 16. The left and right side wall assemblies $12_L$ and $12_R$ are substantially structurally identical in this embodiment. In view of these similarities, and in the interest of simplicity, the following discussion will use a reference numeral in brackets without a letter to designate an entire group of substantially identical structures. For example, the reference numeral 12 will be used when generically referring to each of the left and right side wall assemblies $12_L$ and $12_R$ rather than reciting all two reference numerals. As shown in FIGS. 3A, 5, 6, 7 and 8, each of the side wall assemblies 12, the end wall assemblies 14 and the roof assembly 16 has a substantially planar outer surface. The van-style cargo truck body 10 further comprises opposite horizontally extending curved roof connecting members (roof corner radius members) 18 and vertically extending curved side connecting members (side corner radius members) 20. Each of the roof corner radius members 18 interconnects the end wall assembly 14 and the roof assembly 16, while each of the side corner radius members 20 interconnects the end wall assembly 14 and the side wall assembly 12. Unlike conventional van-style cargo truck bodies, the van-style cargo truck body 10 of the present invention does not have side-roof corner radius members interconnecting the side wall assembly 12 and the roof assembly 16. As illustrated in FIGS. 3A, 3B and 7, the side wall assembly 12 is taller than the end wall assembly 14 so that each of the side wall assemblies 12 is directly connected to the roof assembly 16 without any corner radius member.

Figure 3B:
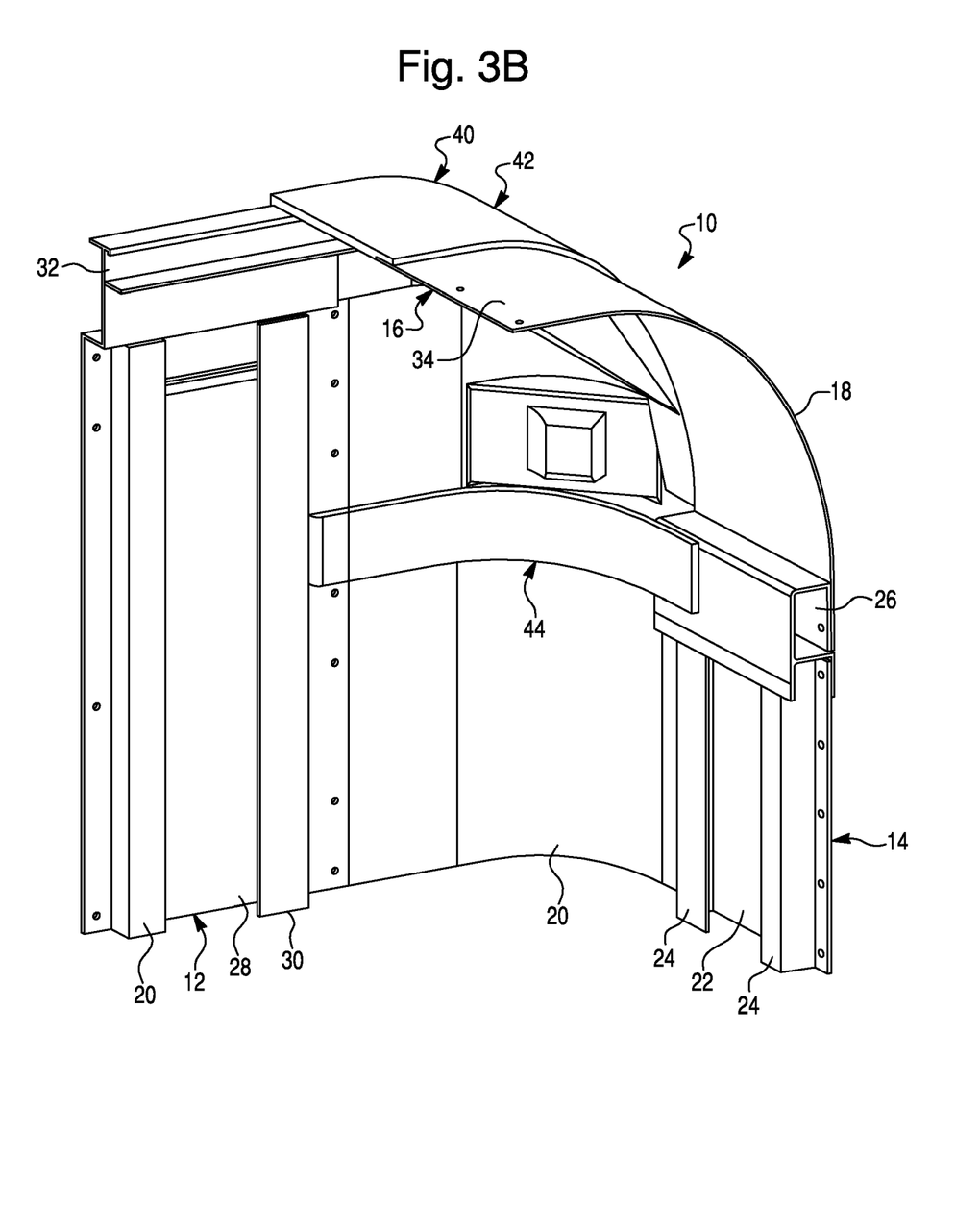
FIG. 3B is a partial interior perspective view of the van-style cargo truck body according to a preferred embodiment of the present invention.
Figure 4:
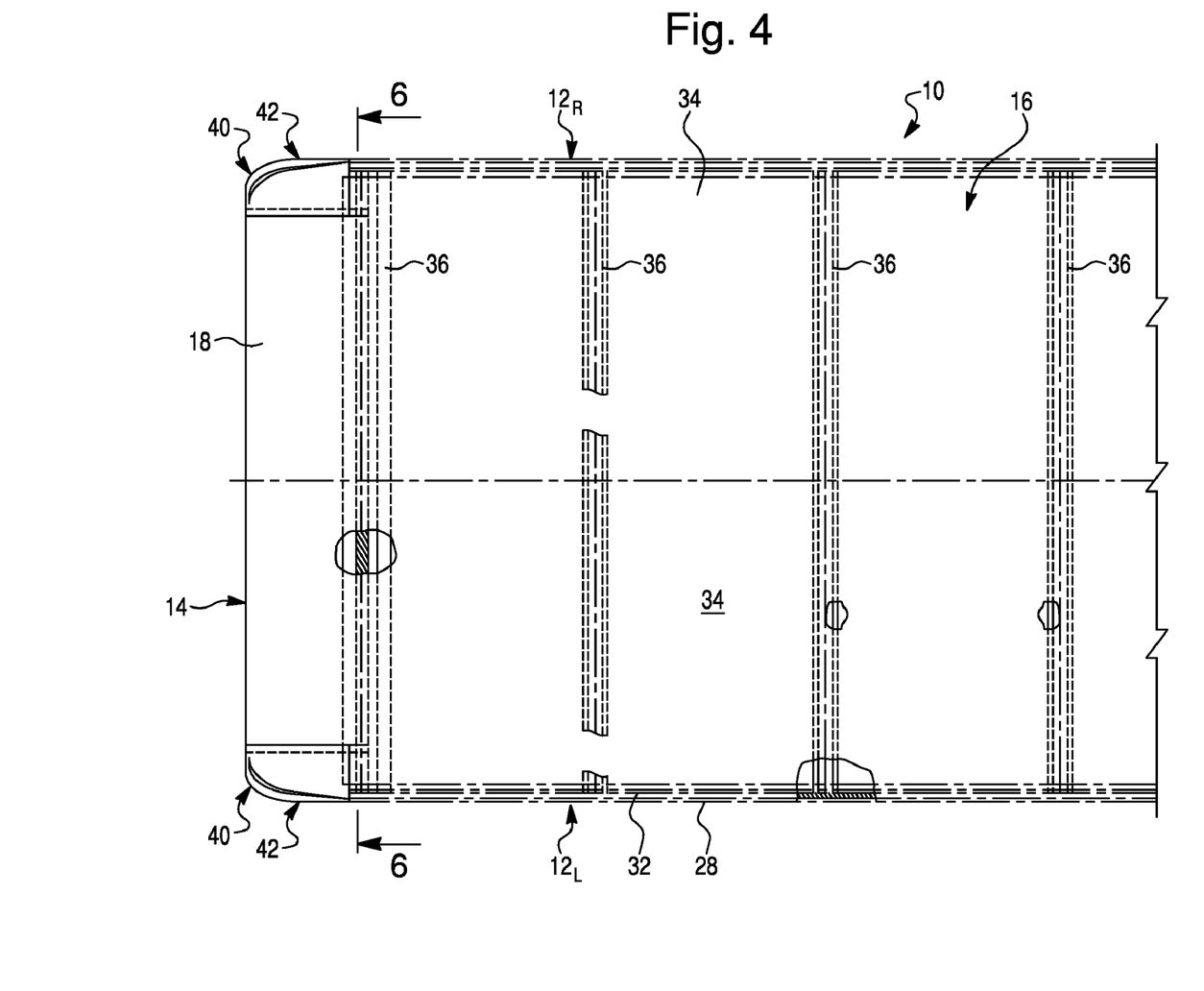
FIG. 4 is a partial top view of the van-style cargo truck body according to the preferred embodiment of the present invention.

As further illustrated in FIGS. 3B, 6 and 7, the end wall assembly 14 comprises a plurality of spaced apart vertical posts 24, a substantially rectangular end panel (or covering sheet, or skin) 22 fastened to the vertical posts 24 by any appropriate means known in the art, such as rivets or bolts, and a box beam 26 horizontally extending along a top edge of the end panel 22 and fastened thereto. Similarly, the side wall assembly 12 comprises a plurality of spaced apart vertical posts 30, a substantially rectangular side panel (or skin) 28 attached to the vertical posts 30, and a rail 32 horizontally extending along a top edge of the side panel 28 and appropriately and fastened thereto. The roof assembly comprises a roof panel (or skin) 34 attached to a plurality of spaced apart straight roof cross members 36 horizontally extending between the rail 32 of the left and right side wall assemblies 12, as illustrated in FIGS. 5 and 6. One of the straight roof cross members 36 is horizontally extending along a front edge of the roof panel 34, as illustrated in detail in FIG. 7.

Figure 8:
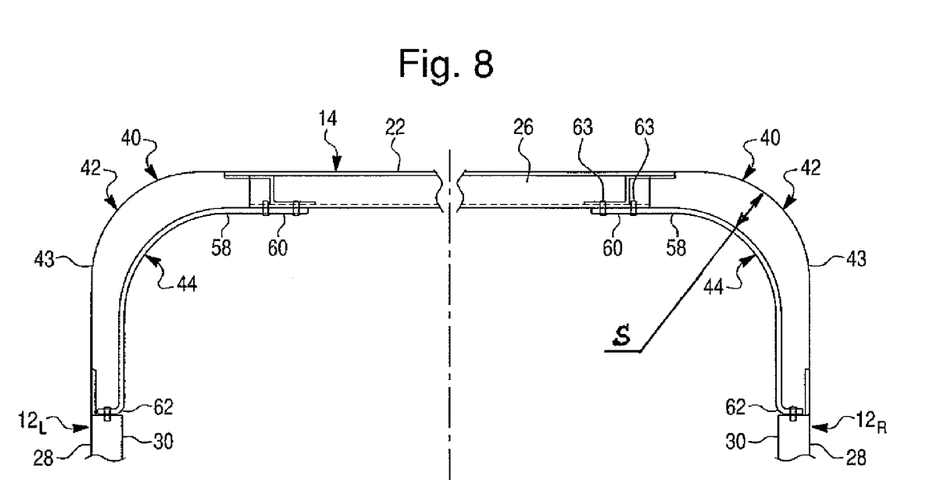
FIG. 8 is a sectional view of the corner cap assembly attached to the van-style cargo truck body taken along the horizontal line 8-8 of FIG. 7.

Each corner of the roof assembly 16 is connected to one of the side wall assemblies 12 and one of the end wall assemblies 14 through a multi-piece corner cap assembly 40. The multi-piece corner cap assembly 40 of the present invention for the van-truck body 10, illustrated in detail in FIGS. 3B, 7 and 8, comprises a soft outer protective cover member 42 (shown in detail in FIGS. 9, 10A and 10B), and a rigid inner stiffening (or reinforcing) member 44 (shown in detail in FIGS. 3B and 6-8) separate from the protective cover member 42 and disposed inside the protective cover member 42 so as to be radially spaced therefrom in the horizontal plane by a distance S being in a range from 1" to 2" (as shown in FIG. 8) and not directly fastened thereto. In other words, the protective cover member 42 is attached (fastened) to each of the converging side wall assembly 12, the end wall assembly 14 and the roof assembly 16 so as to cover the rigid reinforcing member 44 from the outside of the freight body 10. More specifically, the present invention teaches the protective cover member 42 made of relatively soft or flexible or resilient material providing a high impact resistance, such as a polymer (e.g. injection molded), in combination with the rigid stiffening member 44 made of high stiffness and high strength material including metallic or non-metallic material. The polymer protective cover member 42 and the stiffening member 44 together offer a combination of high stiffness, high strength and high impact resistance, at low cost, previously unknown in the prior art. Thus, the multi-piece corner cap assembly 40 of the present invention offers a combination of stiffness, strength, impact resistance and cost effectiveness.

Figure 9:
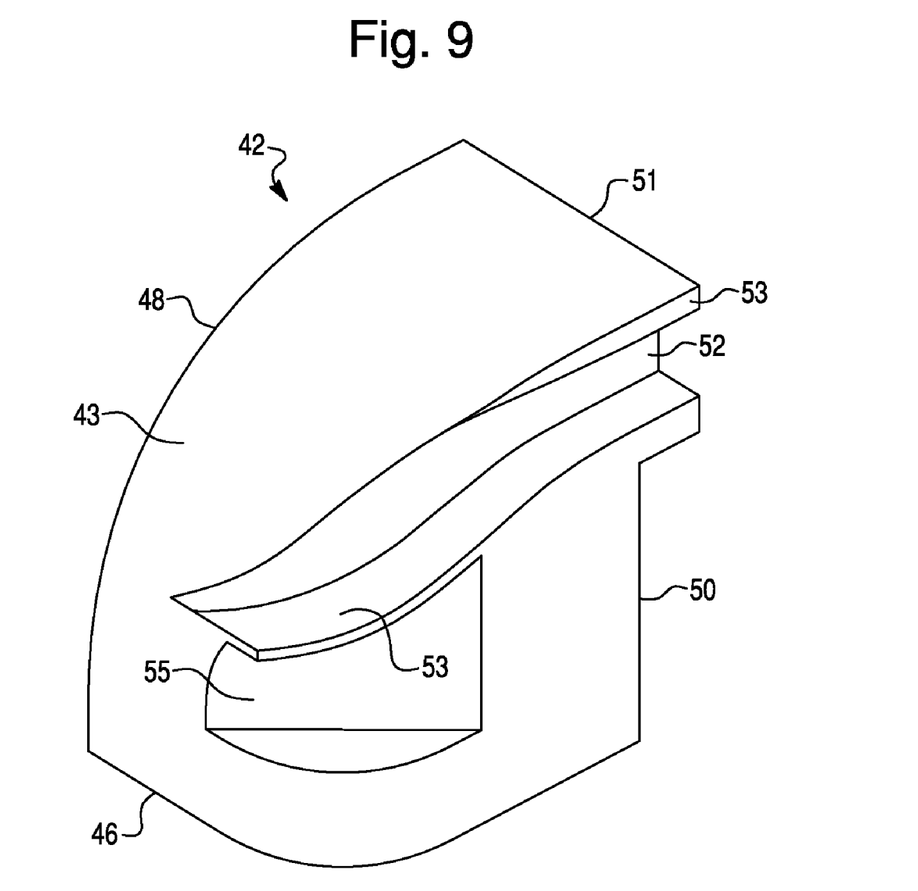
FIG. 9 is a perspective view of a protective cover member of a multi-piece corner cap assembly according to the preferred embodiment of the present invention.
Figure 10A:
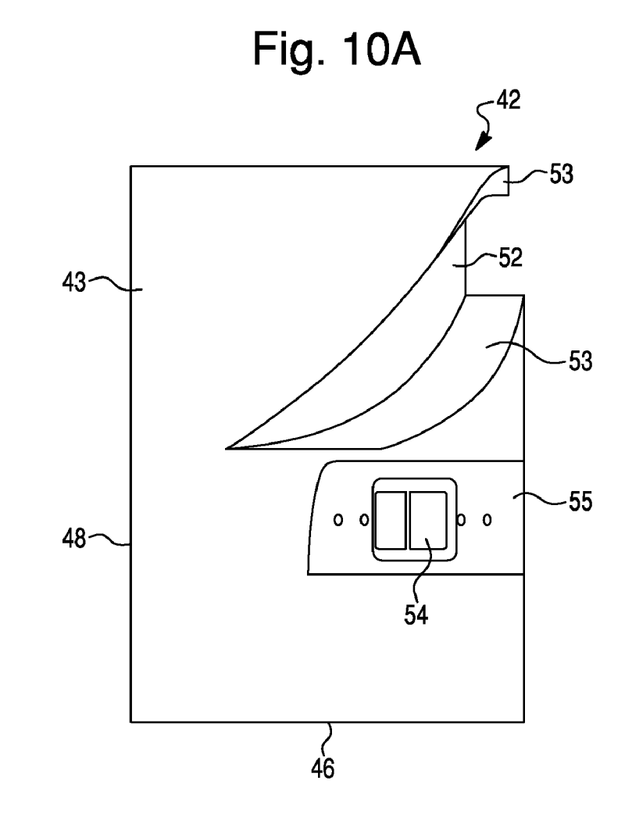
FIG. 10A is a front view of the protective cover member of the multi-piece corner cap assembly according to the preferred embodiment of the present invention.
Figure 10B:
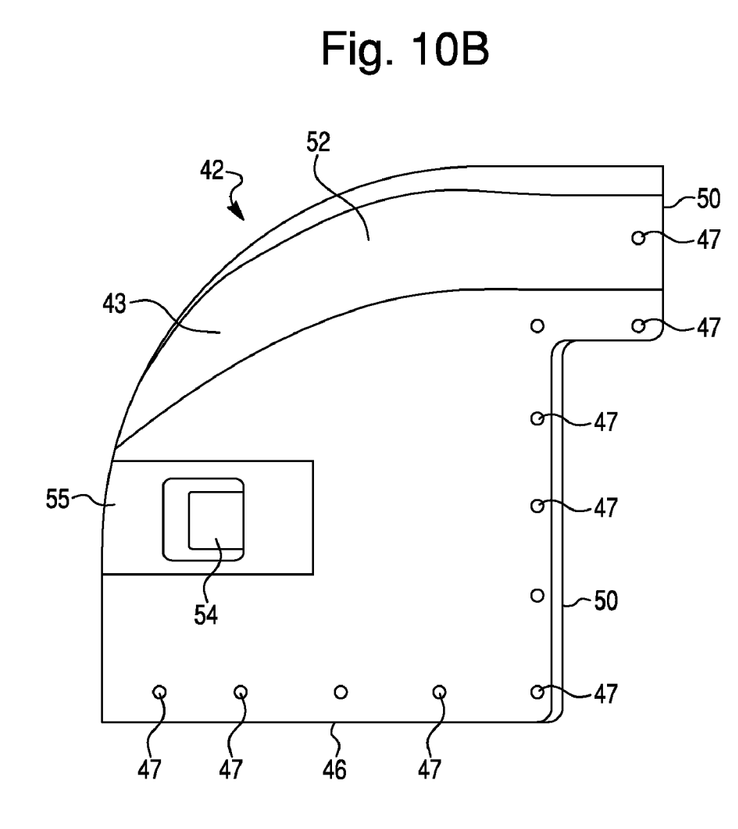
FIG. 10B is a side view of the protective cover member of the multi-piece corner cap assembly according to the preferred embodiment of the present invention.
Figure 11A:
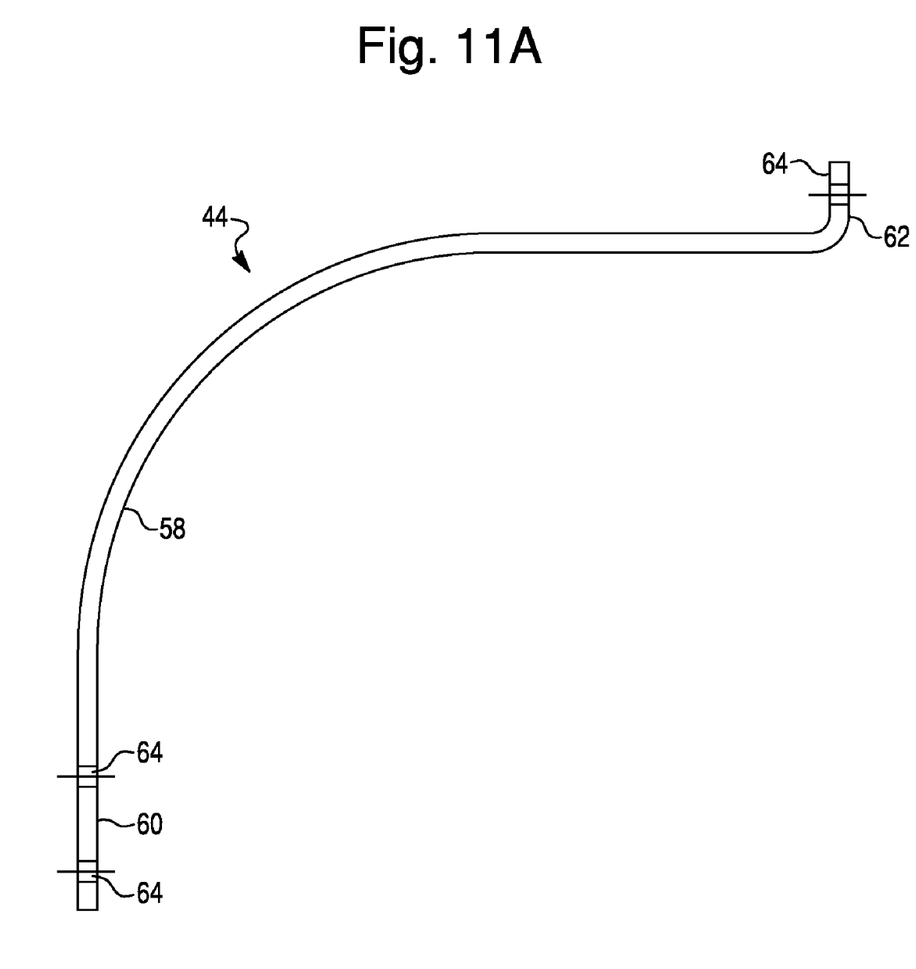
FIG. 11A is a sectional view of a rigid reinforcing member of the multi-piece corner cap assembly in accordance with the preferred embodiment of the present invention.
Figure 11B:
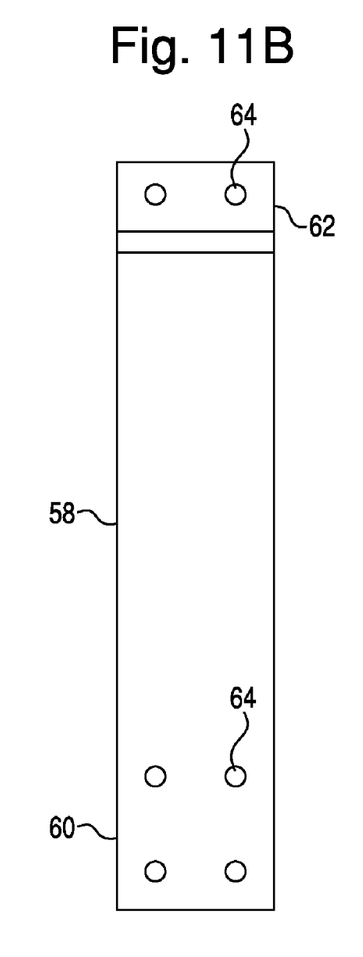
FIG. 11B is a front view of the rigid reinforcing member of the multi-piece corner cap assembly in accordance with the preferred embodiment of the present invention.

Referring now to FIGS. 9, 10A and 10B, the protective cover member 42 will be further described. The protective cover member 42 comprises a hollow curved body 43 having a curved bottom edge 46, a curved side edge 48, a rear edge 50 and a top edge 51. The body 43 of the protective cover member 42 is provided with a plurality of mounting holes 47 disposed along the bottom, side, rear and top edges 46, 48, 50, 51 thereof for receiving appropriate fasteners therethrough. The body 43 of the protective cover member 42 is formed with an air flow channel 52 defined by vertically spaced air deflectors 53 provided to improve aerodynamics of the van-style cargo truck body 10 of the present invention. Furthermore, the body 43 of the protective cover member 42 is formed with a recess 55 provided for mounting a marker lamp 54 to the protective cover member 42, as shown in FIGS. 10A and 10B.

The protective cover member 42 is attached (fastened) to each of the side wall assembly 12, the end wall assembly 14 and the roof assembly 16 using any appropriate fasteners known in the art, such as rivets or screws, extending through the plurality of mounting holes 47 disposed along the bottom edge 46 of the protective cover member 42. The protective cover member 42 is further attached to the curved roof connecting member 18 and to the curved side connecting member 20. More specifically, as illustrated in detail in FIGS. 3B and 4-8, the protective cover member 42 is attached to the vertical post 30 of the side wall assembly 12 adjacent to the protective cover member 42, to the box beam 26 of the end wall assembly 14, and to the straight roof cross members 36 of the roof assembly 16 adjacent to the protective cover member 42. As illustrated, the protective cover member 42 is attached to the van-style cargo truck body 10 so as to cover the stiffening member 44. Contrary to the conventional van-style cargo truck bodies, the protective cover member 42 of the present invention does not carry any significant load, thus can be made from an inexpensive material, such as polymeric material.

With particular reference now to FIGS. 6-8, 11A and 11B, the stiffening member 44 will be described in detail. The stiffening member 44 comprises a substantially L-shaped body 58 (as illustrated in detail in FIGS. 11A and 11B) made of high stiffness and high strength material including metallic or non-metallic material. The body 58 of the stiffening member 44 has a first distal end 60 fastened to the end wall assembly 14 and a second distal end 62 fastened to the side wall assembly 12 using any appropriate fasteners 63, such as threaded fasteners (i.e. bolts/nuts, screws) or rivets. As further illustrated in FIGS. 11A and 11B, each of the distal ends 60 and 60 of the body 58 of the stiffening member 44 is provided with at least two mounting holes 64 adapted to receive the fasteners 63. As illustrated in FIGS. 6-8, the first distal end 60 of the stiffening member 44 is fastened to the box beam 26 of the end wall assembly 14 with the fasteners 63, while the second distal end 62 thereof is fastened to the vertical posts 30 of the side wall assembly 12 adjacent thereto with the fasteners 63. Alternatively, the first distal end 60 and the second distal end 62 of the stiffening member 44 are attached to the box beam 26 of the end wall assembly 14 and the vertical posts 30 of the side wall assembly 12, respectively, by welding.

Therefore, the present invention provides a novel a multi-piece corner cap assembly for an enclosed van-style cargo truck body of a motor vehicle that provides a combination of stiffness, strength, impact resistance and cost effectiveness.

The foregoing description of the preferred embodiment of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. An enclosed freight body of a vehicle for transporting cargo, said enclosed freight body comprising:
   a pair of opposite side wall assemblies, an end wall assembly and a roof assembly; and
   a multi-piece corner cap assembly interconnecting converging portions of one of said side wall assemblies, said end wall assembly and said roof assembly together;
   said multi-piece corner cap assembly including:
      a rigid reinforcing member structurally interconnecting one of said side wall assemblies and said end wall assembly; and
      a protective cover member attached to one of said side wall assemblies, said end wall assembly and said roof assembly so as to cover said rigid reinforcing member from outside of said freight body;
      said protective cover member being made of a flexible impact resistant material and said rigid reinforcing member being made of a high stiffness and high strength material;
      said protective cover member being radially spaced from said rigid reinforcing member in the horizontal plane.

2. The enclosed freight body as defined in claim 1, wherein said protective cover member is made of a polymeric material.

3. The enclosed freight body as defined in claim 1, wherein said rigid stiffening member is made of a metallic material.

4. The enclosed freight body as defined in claim 1, wherein said rigid stiffening member is attached to each of said one of side wall assemblies and said end wall assembly.

5. The enclosed freight body as defined in claim 1, wherein said protective cover member is attached to each of said side panel, said end panel and said roof panel.

6. The enclosed freight body as defined in claim 1, wherein each of said side wall assemblies includes a plurality of spaced apart vertical posts, a side panel attached to said vertical posts and a rail horizontally extending along a top edge of said side panel.

7. The enclosed freight body as defined in claim 6, wherein said end wall assembly includes a plurality of spaced apart vertical posts, an end panel attached to said vertical posts and a box beam horizontally extending along a top edge of said end panel.

8. The enclosed freight body as defined in claim 7, wherein said roof assembly includes a plurality of spaced apart straight roof cross members horizontally extending between said side wall assemblies and a roof panel attached to said straight roof cross members.

9. The enclosed freight body as defined in claim 8, wherein said rigid reinforcing member is fastened to one of said vertical posts of one of said side wall assemblies at one distal end thereof and to said box beam of said end wall assembly at the other distal end thereof.

10. The enclosed freight body as defined in claim 8, wherein said protective cover member is attached to one of said vertical posts of one of said side wall assemblies, said box beam of said end wall assembly and to said straight roof cross members of said roof assembly.

11. The enclosed freight body as defined in claim 10, further comprising a horizontally extending roof corner radius member interconnecting said end wall assembly and said roof assembly.

12. The enclosed freight body as defined in claim 11, further comprising a vertically extending side corner radius member interconnects said end wall assembly and said side wall assembly; and wherein each of said side wall assemblies is directly connected to said roof assembly without any corner radius member.

13. The enclosed freight body as defined in claim 12, wherein said roof corner radius member is fastened to said box beam of said end wall assembly at one end thereof and to said straight roof cross members of said roof assembly at the other end thereof.

14. The enclosed freight body as defined in claim 13, wherein said side corner radius member is fastened to one of said vertical posts of said end wall assembly at one end thereof and to one of said vertical posts of one of said side wall assemblies at the other end thereof.

15. The enclosed freight body as defined in claim 14, wherein said protective cover member is further attached to said side corner radius member and said roof corner radius member.

16. The enclosed freight body as defined in claim 1, wherein said protective cover member comprises a hollow curved body includes an air flow channel defined by at least one air deflector provided to improve aerodynamics of said freight body.

17. The enclosed freight body as defined in claim 1, wherein said protective cover member comprises a hollow curved body provided with an air flow channel defined by vertically spaced air deflectors provided to improve aerodynamics of said freight body.

18. The enclosed freight body as defined in claim 1, further comprising a marker lamp; wherein said protective cover member comprises a hollow curved body that includes a recess provided for mounting said marker lamp to said protective cover member.

* * * * *